(12) United States Patent
Shteyn

(10) Patent No.: US 6,618,764 B1
(45) Date of Patent: *Sep. 9, 2003

(54) METHOD FOR ENABLING INTERACTION BETWEEN TWO HOME NETWORKS OF DIFFERENT SOFTWARE ARCHITECTURES

(75) Inventor: Yevgeniy Eugene Shteyn, Cupertino, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/340,272

(22) Filed: Jun. 25, 1999

(51) Int. Cl.[7] .............................................. G06F 15/16
(52) U.S. Cl. ..................................................... 709/249
(58) Field of Search ................................. 709/249, 318; 710/8, 104; 340/636; 370/402

(56) References Cited

U.S. PATENT DOCUMENTS

| | | | |
|---|---|---|---|
| 5,329,619 A | | 7/1994 | Page et al. ................... 395/200 |
| 5,682,532 A | * | 10/1997 | Remington et al. ......... 709/316 |
| 5,754,548 A | * | 5/1998 | Hoekstra et al. ............ 370/402 |
| 5,812,768 A | | 9/1998 | Page et al. ............. 395/200.09 |
| 5,959,536 A | * | 9/1999 | Chambers et al. .......... 340/636 |
| 6,032,202 A | * | 2/2000 | Lea et al. ....................... 710/8 |
| 6,038,625 A | * | 3/2000 | Ogino et al. ................ 710/104 |
| 6,199,136 B1 | * | 3/2001 | Shteyn ....................... 710/129 |
| 6,237,049 B1 | * | 5/2001 | Ludtke ........................... 710/8 |
| 6,445,690 B2 | * | 9/2002 | Sato et al. ................... 709/249 |
| 6,523,696 B1 | * | 2/2003 | Saito et al. ................. 709/223 |

OTHER PUBLICATIONS

"About the Universal Plug and Play Forum"; UPnP Forum, 2001 Microsoft.*
Quan, Margaret, "Group promises API for home networks by June", Electronic Engineering Times, Oct. 10, 1998, p. 6.*
"Design Patterns: Elements of Reusable Object–Oriented Software", by E. Gamma et al, Addison–Wesley Professional Computing Series, pp. 81–117.
Jini Technology Arthitectural Overview.
Jini Technology Executive Overview.
Jini Technology Fact Sheet.
Jini Technology Now?.

* cited by examiner

Primary Examiner—Zarni Maung
Assistant Examiner—Gregory Clinton
(74) Attorney, Agent, or Firm—Kevin Simons

(57) ABSTRACT

Home networks of different software architectures are integrated with each other. References to software representations of devices and services on a first one of the networks are automatically created. The references are semantically sufficient to enable automatic creation of at least partly functionally equivalent software representations for a second one of the networks so as to make the devices and services of the first network accessible from the second network.

12 Claims, 4 Drawing Sheets

METHOD FOR ENABLING INTERACTION BETWEEN TWO HOME NETWORKS OF DIFFERENT SOFTWARE ARCHITECTURES

FIELD OF THE INVENTION

The invention relates to a system and method for enabling networks of possibly different software architectures, such as a HAVi home network and a Home API-based or a JINI-based home network, to cooperate.

BACKGROUND ART

Home networks and related software architectures such as JINI of Sun Microsystems, Inc, (http://www.sun.com/jini), HAVi (http://www.havi.org), Home API (http://www.homeapi.org), Universal-Plug-and-Play (UPnP) of Microsoft (http://www.microsoft.com/homenet/upnp.htm), have become available for application developers, device manufacturers and service providers.

HAVi Software Architecture

HAVi relates to a core of APIs (application programming interfaces) for digital consumer electronics appliances in a home network so as to provide a standard for the audio/video electronics and the multimedia industries. An API specifies the method required for making requests to an operating system or application program. The home network is considered a distributed computing platform. The primary goal of the standard, referred to as the HAVi (Home Audio/Video interoperability) architecture is to ensure that products of different vendors can interoperate, i.e., cooperate to perform application tasks. Current CE devices, such as home entertainment equipment (DVD players, DV camcorders, digital TV sets, etc.) are digital processing and digital storage systems. Connecting these devices in networks makes it possible to share processing and storage resources. This allows coordinating the control of several CE devices simultaneously, e.g., in order to simplify user-interaction. For example, a first device may instantiate recording on a second device while accessing an EPG (electronic program guide) on a third device. The home network provides the fabric for connecting the CE devices. It allows connected devices to exchange both control (one device sending a command to another) and AV (audio/video) data (one device sending an audio or video stream to another device). The network has to meet several requirements in order to achieve all this. It must support timely transfer of high-data-rate AV streams. The network must support self-configuration, self-management, and hot plug-and-play. It must require low-cost cabling and interfaces.

The HAVi software architecture is platform-independent and based on Java. HAVi uses the IEEE 1394 high-performance serial bus protocol for transport of control and content among the devices connected to the network. The IEEE 1394 standard is a dynamically configurable, low-cost digital network. IEEE 1394 defines both a backplane physical layer and a point-to-point cable-connected virtual bus implementations. The backplane version operates at 12.5, 25 or 50 Mbits/sec. The cable version supports data rates of 100, 200 and 400 Mbits/ sec. The standard specifies the media, topology, and the protocol. The IEEE 1394 transport protocol is particularly useful for supporting audio and video communication protocols, due to its high data-rate capability.

The HAVi architecture controls the CE devices in the network through abstract representations of the CE devices. The abstract representations are operated upon by a controller and hide the idiosyncrasies of the associated real CE devices. The abstract representation thus provides a uniform interface for higher levels of software. The abstract representations are registered with their control properties.reflecting those of the device represented. The abstract representations expose their Interoperability API=s to the applications and collectively form a set of services for building portable, distributed applications on the home network.

The architecture allows a device to send a command or control information to another device in the home network. A HAVi-compliant device contains data (above abstract representation, referred to as Device Control Model or DCM, see further below) relating to its user-interface (e.g., GUI) and to its control capabilities. This data includes, for example, HAVi bytecode (Java) that can be uploaded and executed by other devices on the network. A HAVi-compliant device has, as a minimum, enough functionality to communicate with other devices in the system. During interaction, devices may exchange control and data in a peer-to-peer fashion. This ensures that at the communication level, none of the devices is required to act as the master or controller of the system. On the other hand, it allows a logical master or controller to impose a control structure on the basic peer-to-peer communication model. HAVi distinguishes between controllers and controlled devices as explained further below. A controller is a device that acts as a host for a controlled device. A controller hosts the abstract representation for the controlled device. The control interface is exposed via the API of the abstract representation. This API is the access point for applications to control the device.

HAVi-compliant CE devices are devices categorized as follows: Full-AV devices (FAV=s), Intermediate-AV devices (IAV=s) and Base-AV devices (BAV=s).

An FAV contains a complete set of the software components of the HAVi-software architecture (see below). An FAV is characterized in that it has a runtime environment for HAVi bytecode. This enables an FAV to upload bytecode from other devices for e.g., providing enhanced capabilities for their control. An FAV may be formed by, e.g., a HAVi-compliant Set Top box, a HAVi-compliant Digital TV receiver, and a home PC. For example, an intelligent TV receiver can be the HAVi controller of other devices connected on the network. The receiver gets the bytecode uploaded from another device for creating a UI for this device and for providing external control of this device. An icon presenting this device can be made to appear on the TV screen and user interaction with the icon may cause elements of the control program to actuate the represented device in a pre-specified manner.

An IAV does not provide a runtime environment for HAVi bytecode, but may provide native support for control of specific devices on the home network. An IAV comprises embedded software elements that provide an interface for controlling general functions of the specific devices. These software elements need not be HAVi bytecode and may be implemented as native applications on the IAV that use native interfaces to access other devices.

A BAV may provide uploadable HAVi bytecode but does not host any of the software elements of the HAVi architecture. A BAV is controllable through an FAV by means of the former=s uploaded bytecode. A BAV is controllable through an IAV via the native code. Communication between an FAV or IAV, on the one hand, and a BAV on the other hand requires that the HAVi bytecode be translated to and from the command protocol used by the BAV.

The main software elements included in the core specification of the HAVi architecture are the ones listed below. For a more detailed explanation of these elements, please see the HAVi spec., herein incorporated by reference.

1) A 1394 Communications Media Manager (CMM)—acts as an interface between the other software elements and the IEEE 1394.

2) An Event Manager (EM)—informs the various software elements of events in the network such as the changes in the network configuration that occur when appliances (devices) are added or removed from the network.

3) A Registry—maintains information about the appliances connected to the network and the functions they offer. Applications can obtain this information from the registry.

4) A Messaging System (MS)—serves as an API that facilitates communication between the software elements of the various appliances on the network. The messaging system provides the HAVi software elements with communication facilities. It is independent of the network and the transport layers. A messaging system is embedded in any FAV and IAV. The messaging system is in charge of allocating identifiers for the abstract representations at the FAV or IAV. These identifiers are first used by the abstract representations to register at the FAV or IAV. Then they are used by the abstract representations to identify each other within the home network. When a first abstract representation wants to send a message to another abstract representation it has to use the identifier of the latter while invoking the messaging API.

5) A Device Control Module (DCM)—represents an appliance on the network. Application programs can interact directly with a DCM. This shields them from the idiosyncrasies of each individual appliance.

6) A DCM Manager—Installs the DCMs. It automatically reacts to changes in the network by installing new DCMs for new appliances.

7) A Data Driven Interaction (DDI) Controller—renders a GUI (Graphical User Interface) on a appliance=s display on behalf of a HAVi software element. It supports a wide range of displays, varying from graphical to text-only. A DCM may provide a user-interface (UI). The DCM can present the UI one or more devices on the network that have a display. One mechanism to achieve this is called DDI (Data Driven Interaction). Using this mechanism, a DCM can offer a DDI description of its UI. The description can be retrieved by any HAVi-compliant device with a display. The user can interact with the UI via the local display. A user-interaction results in messages being sent to the associated DCM for control of the physical device represented by the DCM.

8) A Stream Manager (SMGR)—creates connections and routes real-time AV streams between two or more appliances on the network.

The HAVi architecture specifies at least two levels of interoperability, referred to as level 1 and level 2.

Level 1 interoperability addresses the general need to allow existing devices to communicate at a basic level of functionality. To achieve this, level 1 interoperability defines and uses a generic set of control messages (commands) that enable one device to communicate with another device, and a set of event messages that it should reasonably expect from a device given its class (TV, VCR, DVD player, etc). To support this approach a basic set of mechanisms is required: device discovery; communication; and a HAVi message set.

As to device discovery: each device in the home network needs a well-defined method that allows it to advertise its capabilities to others. The HAVi approach is to utilize so-called SDD data: self describing data. The SDD data is required on all devices in the network. SDD data contains information about the device which can be accessed by other devices. The SDD data contains, as a minimum, enough information to allow instantiation of a so-called embedded device control module (embedded DCM). An embedded DCM is a piece of code pre-installed on a controlling IAV or FAV in platform-dependent code and using native interfaces to access the IAV=s or FAV=s resources. As mentioned above, a DCM for a device is a software element that provides an interface for control of general functions of the device. Instantiation of an embedded DCM results in registration of the device=s capabilities with a registry. The registry provides a directory service and enables any object on the network to locate another object on the network. Registering allows applications to infer the basic set of command messages that can be sent to a specific device on the network.

As to communication: once an application has determined the capabilities of a device, the application needs to be able to access those capabilities. This requires a general communication facility allowing applications to issue requests to devices. This service is provided by the HAVi messaging systems and DCMs. The application sends HAVi messages to DCMs, the: DCMs then engage in proprietary communication with the devices.

As to HAVi message sets: in order to support level 1 interoperability a well-defined set of messages is required that must be supported by all devices of a particular known class (e.g., the class of TV receivers, the class of VCR=s, the class of DVD players, etc.). This ensures that a device can work with existing devices, as well as with future devices, irrespective of the manufacturer.

These three basic requirements support a certain minimal level of interoperability. Since any device can query the capabilities of another via.the registry, any device can determine the message set supported by another device. Since applications have access to the messaging system, any device can interact with any other device.

Level 1 interoperability ensures that devices can interoperate at a basic level of functionality. However, a more extended mechanism is needed to also allow a device to communicate to other devices with any additional functionality that is not present in the embedded DCM=s on an FAV. For example, embedded DCM=s may not support all features of existing products and are unlikely to support those totally new ones of future product categories. Level 2 interoperability provides this mechanism. To achieve this, the HAVi Architecture allows uploadable DCM=s as an alternative to the embedded DCM=s mentioned above. The uploaded DCM may replace an existing DCM on an FAV. An uploadable DCM may be provided by any suitable source, but a likely technique is to place the uploadable DCM in the HAVi SDD data of the BAV device, and upload from the BAV to the FAV device when the BAV is connected to the home network. Because the HAVi Architecture is vendor-neutral, it is necessary that the uploaded DCM will work on a variety of FAV devices all with potentially different hardware architectures. To achieve this, uploaded DCMs are implemented in HAVi (Java) bytecode. The HAVi bytecode runtime environment on FAV devices supports the instantiation and execution of uploaded DCMs. Once created and running within a FAV device, the DCM communicates with the BAV devices in the same manner as described above.

The efficiency of level 2 interoperability becomes clear when one considers resources needed to access a specific device functionality. Level 2 allows a device to be controlled via an uploaded DCM that presents all the capabilities offered by the device, whereas to achieve similar functionality in level 1, this DCM would have to be embedded somewhere in the network. For example, when a new device is added to a,network, level 1 requires that at least one other device comprises an embedded DCM compatible with the new device. In comparison, level 2 only requires that one device provide a runtime environment for the uploaded DCM obtained from the new device.

The concept of uploading and executing bytecode also provides the possibility for device-specific applications called Device Control Applications. Through these applications a device manufacturer can provide the user a way to control special features of a device without the need for standardizing all the features in HAVi. The application is provided by a DCM in HAVi bytecode and can be uploaded and installed by each FAV device on the network.

For further information, reference is made to the HAVi specification and the IEEE 1394 specification that are available in the public domain. The HAVi core specification has been made available on the web at, for example, http://www.sv.philips.com/news/press, and is incorporated herein by reference.

Home API Architecture

A Home API system comprises software services and application programming interfaces (API=s) that allow software applications running on a PC to discover and interact with controllable devices that have registered with the system. The home environment may include devices such as TV=s, VCR=s, set top boxes, home security systems, lights, etc. Home API=s are protocol-independent and hide differences in the underlying networks and inter-device communication protocols transparent from the software applications. The manner wherein the application accesses a device is uniform and independent of the underlying protocol that is used for communication with the device.

Software applications interact with the devices by setting or getting properties of software objects created to represent those devices. Applications can also subscribe to events involving a device=s property changes in order to be notified of these changes.

The Home API architecture comprises components called service providers. These components are dedicated to underlying devices and networks and serve to translate the high-level operations on the software object=s properties into commands sent to the associated devices across the network. The service providers implement the Home API software objects. The service provider component is also responsible for generating property change events for the objects associated with the service provider.

In more detail, Home API uses a computing model based on Component Object Model (COM/DCOM) technology of Microsoft. For more information, see, e.g., the Component Object Model Specification version 0.9 of October 1995 as supplied by Microsoft, herein incorporated by reference. COM is object-oriented. An object has properties that represent control functionalities of an associated electronic device as exposed to a software application. A state change of an object as a consequence of an event from outside is passed on to the software application. The application manipulates the objects by changing or setting their properties. When the application modifies a property of an object associated with a certain physical device a command is sent to the associated device.

COM is a generic mechanism allowing applications to communicate in a consistent way and is a framework for developing and supporting program component objects. It provides capabilities similar to those defined in CORBA (Common Object Request Broker Architecture), the framework for the interoperation of distributed objects in a network. OLE (object linking and embedding) provides services for the compound document that users see on their display, COM provides the underlying services of interface negotiation and event services (putting one object into service as the result of an event that has happened to another object). In this implementation clients are modeled as OLE Automation objects (abstract representations) that use properties to expose controls and events to signal state changes. OLE Automation is a COM technology that enables scripting and late binding of clients to servers. OLE Automation provides communication with other programs through calls to features (commands and queries) that the programs have made available for external use. Before using an object, a client application has first to obtain the object=s interface pointer. The interface pointer is obtained through the network=s directory by binding the object=s name or by enumerating devices. Standard COM API=s for moniker binding can be used. References to objects can be obtained by calling GetObject or CoGetObject with a string specifying the desired device=s name or ID. The application can then manipulate the object by setting or retrieving its properties through Aset property= calls to the appropriate properties. When an application sets or modifies a property of an object corresponding with a device the property-setting operation or modification operation is converted into a command that is sent across the network to the relevant device. The objects may differ in implementation, but expose a similar property-based model to client applications running on a controller, e.g., a PC with a Windows-based operating system.

JINI Architecture

JINI simplifies interconnecting and sharing of devices on a network. In conventional systems adding a device to a PC or a network requires installation and boot-up. In JINI the device declares its presence and provides information about its functionalities. Thereupon, the device becomes accessible to other resources on the network. This technology enables distributed computing: capabilities are shared among the network=s resources.

JINI focuses on the process of adding a device to the network and broadcasting information about the device to other machines. In this way, JINI provides a "Lookup" service that allows applications on other machines to use the newly added device. The approach of JINI assumes the network and operating system have already been configured so that each computer already knows about other computers. JINI's functionality occurs at a layer above the network. It does not, for example, solve the problems of automatic configuration of the network upon connection, disconnection, or reconnection. It assumes that the network is up or down, independent of JINI. JINI leverages the services provided by the network to implement its services.

More particularly, the JINI networking infrastructure provides resources for executing Java programming language objects, communication facilities between those objects, and the ability to find and exploit services on the network. By using Java Remote Method Invocation (RMITM), JINI provides communication between objects across device boundaries thus enabling those objects to work together. RMI enables activation of objects and the use of multicast to contact replicated objects, providing high availability and high reliance objects to be easily implemented in the JINI framework. RMI is an extension to traditional remote procedure call mechanisms. RMI allows not only data to be passed from object to object around the network but full objects, including code. Much of the simplicity of the JINI system is based on this ability to move code around the network in a form that is encapsulated as an object. JINI provides a lookup service allowing services connected by the communication infrastructure to be found. JINI further provides a mechanism, referred to as Discovery/Join—for JINI-enabled devices (e.g., disk drives, printers, and computers) to discover the appropriate lookup service and join into the overall system. When a device joins a JINI-based system, its services are added to this lookup service. Similarly, when a JINI-enabled device leaves the system, e.g., by being removed or by becoming unreliable, its services are deleted from the lookup service.

For more information on home networks, especially on HAVi, the use of COM technology and OLE Automation objects and Home API, and on JINI, reference is made to the following documents, incorporated herein by reference: the publicly available specifications of the HAVI architecture (e.g., version 0.86), the specifications of the Component Object Model Specification (e.g., version 0.9), the Home API White Paper of March 1999 provided by the Home API Working Group, the JINI Architecture overview of Sun Microsystems, Inc. (including the Java Remote Invocation Specification, the Java Object Serialization Specification, the JavaSpaces Specification, etc.).

Each one of the specific HAVi, Home API, JINI, etc., software architectures has its own advantages and disadvantages.

For example, JINI allows for Java objects being transferred from one network platform environment to another for being run locally. On the downside, it does not always leverage platform-specific features. Further, since JINI is based on Java, which is an interpreted language, it cannot perform as well as compiled native code.

HAVi is designed to handle high-bandwidth IEEE1394 audio-video equipment. It provides extensibility, through software components (DDI, Java, etcΨ) downloadable from devices, and other useful features. On the other hand, devices that do not have an IEEE 1394 connection or interface, cannot be easily controlled by a HAVi application.

Home API leverages Windows COM/DCOM software architecture and services, but it is not yet widely available on other operating systems, such as UNIX, LINUX, Apple Mac OS, etc.

As computing or controlling devices, such as PC=s, Set-top boxes, digital TV=s, VCR=s, X10 modules, etc. are acquired by consumers at different times for different purposes, it becomes important to develop solutions for bridging home networks and architectures. Such software solutions are most likely to appear on relatively rich computing platforms such as PC=s, Set-top boxes, video game machines, etc. Within this context, PC=s that cost $1,000 or less have continued to dominate at PC retailers over 1998 and into 1999, with the largest growth in the segment with prices below $600. PC manufacturers Emachines, Packard-Bell and NEC are currently (1999) major suppliers to this market segment. Emachines, for example, provides sub-$600 PC=s that have high-end features such as DVD drives, fast 400 MHz Intel processors, and 32 MB RAM=s. Similar trends are taking place in the video games segment, where Sega and others have scheduled releases of 64-bit gaming machines. Most of the new devices come with modems or other connectivity options in order to enable them to be a part of a network.

Each of the above-mentioned known software architectures provides a service that enables discovery of devices or services on the network, from the abstract point of view in a more or less similar fashion. As the end result of a discovery process, a software representation of a device or a service is placed into a Look up (or Registry or Directory) service. The HAVi architecture registers the discovered devices or services in the Registry, the JINI architecture registers them with a Look-Up service, Home API refers to the service as a Directory. Thereupon the registered devices or services become available to software applications running on the host. An application locates the software representation or object and uses it according to access interfaces and reservation procedures of the particular software architecture.

OBJECT OF THE INVENTION

A problem arises when a controlling device hosts more than one networking environment. For example, a PC with an IEEE 1394 connection can be part of a HAVi as well as of a Home API environment. Therefore, there is a potential for HAVi=s audio-video devices being accessible by Home API applications and, vice versa, Home API controllable devices being controlled by HAVi applications; etc. If this potential were realized in practice, users would perceive these two home networking environments as one, ease of use would be increased and accessibility options would be enhanced. It would also allow software developers to create applications with a wider range of controllable devices than was possible heretofore.

Further facilitating of such hybrid functionality is necessary in order to accommodate existing and emerging home networking architectures and applications.

Accordingly, it is an object of the invention to provide a method to enable bridging between different home networking environments and therefore, to enable increase functionality of the home network as a whole.

SUMMARY OF THE INVENTION

The method of the invention uses a software component (Reference Factory) in a networking environment. The component detects software representations of devices or services available in a first network of the environment. This can be done through enumeration and/or monitoring of a Home API Directory, HAVi Registry, JINI Registry or an functionally equivalent inventory-related service on the first network. Upon detection of a new software representation by the Reference Factory, the latter creates a reference to be associated with the software representation detected on the first network. Such reference comprises information, e.g., a class id, a URL, an object unique identifier, an XML or DDI descriptor, etc., necessary for the creation of at least partly functional representation of the device or service within another network software environment.

The reference information is accessed by another software component (Object Factory) capable of creating such software representations (objects) making it available for the other network. The Object Factory creates an object if necessary, or retrieves a pre-fabricated object from, e.g., a web site given its URL, or passes the reference along according to the rules and/or preferences of the network environment it interacts with. These preferences reflect, for example, general architecture guidelines or specific user interest. For example, only a certain type of devices (Light) is of interest to the user. Another example is a HAVi environment where, based on the network configuration, only DDI representations are acceptable.

Multiple Reference Factories can be present in a particular network software architecture. Each one of them can be responsible for certain types of references, such as for other network software environments (JINI, HAVi, Home API, UPnP), or other object representations within such network (e.g., for HAVi: Java DCM, DDI data, or Native DCM), or a class of devices/services (data storage, home automation, A/V command set, etcΨ).

The invention is based on the insight to de-couple two processes: the analysis of the network software configuration on the one hand and the creation of software representations (objects), necessary for control and/or interaction, on the other hand. Factory methods of object creation are known in the art. See, for example, ADesign Patterns: Elements of Reusable Object-Oriented Software≈, Addison-Wesley Professional Computing, by Erich Gamma, Richard Helm, Ralph Johnson, and John Vlissides, October 1994, Addison-Wesley Pub Co; ISBN: 0201633612, especially pages 81–116.

In particular, the invention relates to a method of enabling a first network of a first software architecture to interact with a second network of a second software architecture. The method comprises following steps: an enabling to detect a first software representation of a device or of a service in the first network; an enabling to form a reference for the first software representation detected; and an enabling to create an at least partly functionally equivalent second software representation based on the created reference and for being accessible from the second network. The first and second networks may have identical software architectures, e.g., both are HAVi-based, or the first and second networks may have different software architectures: for example, one of the first and second networks is based on a HAVi architecture, and the other is based on a Home API architecture; one of the first and second networks is based on a HAVi architecture and the other is based on a JINI architecture; one of the first and second networks is based on a HAVi architecture and the other is based on a UPnP architecture; one of the first and second networks is based on a JINI architecture and the other is based on a Home API architecture; one of the first and second networks is based on a JINI architecture and the other is based on a UPnP architecture; one of the first and second networks is based on a UPnP architecture and the other network is based on a Home API architecture, etc., etc.

Each of the examples of the software architectures mentioned above has a discovery service that enables to create an inventory of devices and/or services registered with the relevant network. The method of the invention uses this discovery service and the Registry/Directory/Look-up functionality to enable to detect what is available by querying this inventory. Then, the enabling to form comprises enabling to extract information about the first software representation relevant to its functionality from the viewpoint of the second network; and the enabling to create comprises building a second software representation based on the information extracted.

The following patent documents are incorporated herein by reference:

U.S. Ser. No. 09/146,020, now U.S. Pat. No. 6,199,136, filed Sep. 2, 1998 for Yevgeniy Shteyn for LOW DATA-RATE NETWORK REPRESENTED ON HIGH DATA-RATE HAVi-NETWORK. This document relates to a PC-based home automation system that uses a low data-rate transport layer and COM-based software components, such as in Home API, for control of devices in a home automation network. The home automation system is merged with a messaging-based HAVi-network that uses IEEE 1394 as a high data-rate transport layer. The HAVi-network controls audio/video equipment in a home entertainment system. The home automation services and devices are registered as a HAVi-compliant elements with the HAVi network=s FAV or IAV controllers. The home automation resources (devices and services) have both COM OLE Automation Interfaces and HAVI-compliant interfaces to permit control of the home automation system from the HAVi-network.

U.S. Ser. No. 09/107,525, now U.S. Pat. No. 6,163,817, filed Jun. 30, 1998 for Yevgeniy Shteyn and Gregory Gewickey for DYNAMIC DE-REGISTERING OF DEVICES IN SYSTEM WITH MULTIPLE COMMUNICATION PROTOCOLS. This document relates to an information processing system has first and second electronic sub-systems, and control means for controlling the sub-systems. At least the first sub-system has a software representation registered with the control means. The control means changes a state of the first sub-system through interacting with the software representation. The first and second sub-systems are also capable of interacting directly with one another without the control means being involved. To avoid conflicts, at least the first sub-system is capable of de-registering with the control means so as to functionally disable its software representation at the control means.

U.S. Ser. No. 08/731,624, now U.S. Pat. No. 5,959,536, filed Oct. 15, 1996 for Paul Chambers and Saurabh Srivastava for TASK-DRIVEN DISTRIBUTED MULTIMEDIA CONSUMER SYSTEM. This document relates to a control system with multiple consumer electronics devices and task-driven control means coupled to the devices for controlling an interaction among the devices. The control means acts on respective software representations of each respective one of the consumer devices. By encapsulating the variable complexity of the task within a software representation, it can be made as simple or as sophisticated as needed to bring the capabilities up to a common level. Since the level of interface is common to the devices, applications can uniformly manipulate devices which embody very different levels of sophistication.

U.S. Ser. No. 09/222,402 filed Dec. 29, 1998, now U.S. Pat. No. 6,480,473 for Paul Chambers and Steven Curry for VERIFICATION OF ACTIVE NODES IN OPEN NETWORKS. This document relates to a network polling protocol which treats the network as a logical ring or linear sequence of nodes linked together. A polling request is simply propagated down or around the network one node at a time until a complete inventory of active nodes is achieved. The protocols also includes procedures for curing or repairing breaks in the linking protocol and for adding new nodes to the linking protocol. The linking protocol can also be used to establish hierarchal linked networks where top level hierarchies includes addresses to a permanent member of a linked network and bottom level hierarchies are a given linked network.

U.S. Ser. No. 09/133,622, now U.S. Pat. No. 6,314,459, filed Aug. 13, 1998 for Lawrence Freeman for HOME-NETWORK AUTOCONFIGURATION. This document relates to the automatic configuring of two PC=s in a network in order to share resources registered at the individual PC=s. Services and resources local to one PC are registered with the other PC and vice versa. The registry hides whether a service or resource is remote or local. In operational use of the network, a resource or service local to one PC is addressable from the remote PC as if it were local to the latter. A home network of PC=s is configured automatically in this manner.

U.S. Ser. No. 09/165,683 filed Oct. 2, 1998 for Yevgeniy Shteyn for CALLS IDENTIFY SCENARIO FOR CONTROL OF SOFTWARE OBJECTS VIA PROPERTY ROUTES. This document relates in particular, but not exclusively, to Home API, and relates to an information processing system with first and second physical components represented by first and second software objects. Both objects have properties that are changeable through calls to the objects. The system enables registering a property route linking a first property of the first object to a second property of the second object so that a change in the first property causes the second call being issued to the second object upon invoking the property route. The input call to the first object comprises an identifier enabling to conditionally invoke the route. In this manner, routes belonging to different scenarios are being kept independent so that the system operates more reliable that without scenario identifiers.

U.S. Ser. No. 09/165,682 filed Oct. 2, 1998, now U.S. Pat. No. 6,434,447 for Yevgeniy Shteyn for CONTROL PROPERTY IS MAPPED ONTO MODALLY COMPATIBLE GUI ELEMENT. This document relates in particular, but not exclusively, to Home API, and relates to an information processing system that comprises an electronic device and a controller for control of a functionality of the device. An abstract representation of the functionality is provided to the controller. The abstract representation exposes a modality of controlling the functionality. The controller enables controlling the functionality through interaction with the abstract representation. The modality controls associating the control of the functionality with a modally compatible controlling capability of the controller. The modality exposed can be, for example, ABoolean≡, Afloat≡, Ainteger array≡.

U.S. Ser. No. 09/176,171 filed Oct. 21, 1998 for Doreen Cheng for DISTRIBUTED SOFTWARE CONTROLLED THEFT DETECTION. This document relates to providing a framework for a security system that is property specific. The framework comprises a distributed software controlled security system that monitors and assesses the status of individual property devices. The activation of an alarm and the action taken in response to the alarm are determined by the state of the secured property device and the rules associated with each state of combination of states. Dependent on the capabilities of the individual property devices the security functionalities are distributes among the devices. In a preferred embodiment, the communication of messages among the components of the system is in accordance with HAVi or Home API standards, thereby allowing interoperability among components of various vendors.

U.S. Ser. No. 09/160,490 filed Sep. 25, 1998 for Adrian Turner et al., for CUSTOMIZED UPGRADING OF INTERNET-ENABLED DEVICES BASED ON USER-PROFILE. This document relates to a server system that maintains a user profile of a particular end-user of consumer electronics network-enabled equipment and a data base of new technical features for this type of equipment, e.g., a home network. If there is a match between the user-profile and a new technical feature, and the user indicates to receive information about updates or sales offers, the user gets notified via the network of the option to obtain the feature.

U.S Ser. No. 09/189,535 filed Nov. 10, 1998 for Yevgeniy Shteyn for UPGRADING OF SYNERGETIC ASPECTS OF HOME NETWORKS. This document relates to a system with a server that has access to an inventory of devices and capabilities on a user=s home network. The inventory is, for example, a look-up service as provided by HAVi, JINI and Home API architectures. The server has also access to a data base with information of features for a network. The server determines if the synergy of the apparatus present on the user=s network can be enhanced based on the listing of the inventory and on the user=s profile. If there are features that are relevant to the synergy, based on these criteria, the user gets notified.

U.S. Ser. No. 09/189,534 filed Nov. 10, 1998 for Yevgeniy Shteyn for CONTENT SUPPLIED AS SOFTWARE OBJECTS FOR COPYRIGHT PROTECTION. This document relates to the supply of content information such as a movie, an audio file or a textual message to an end-user. The content information is comprised in a software object that has an encapsulated procedure for end-user access of the content information in a runtime environment. The object can specify time frame for and manner wherein the content information is to be accessed. Since the procedure is encapsulated in the object together with the content data, and since transport of the object over the Internet is done after serializing, an adequate degree of security is provided against unauthorized play-out or copying.

U.S. Ser. No. 09/213,527 filed Dec. 17, 1998, now U.S. Pat. No. 6,499,062, for Yevgeniy Shteyn for SYNCHRONIZING PROPERTY CHANGES TO ENABLE MULTIPLE CONTROL OPTIONS. This document relates in particular, but not exclusively, to Home API, and deals with an information processing system such as a home network. Components on the network are represented by software objects whose properties can be changed through function calls (see COM mentioned above). Setting a property of an object controls the associated component. Properties are connected through routes that propagate state changes throughout the system without the need for a running client application. Two-way property routes are used to keep consistence among a controlled object and multiple controlling objects without the risk of endless loops. To achieve this, the two-way route is executed to change a state of a specific one of the properties upon a change of state of another one of the properties if the change of state of the other property was caused by an effect other than the route itself. This mechanism enables synchronizing components automatically from multiple control inputs.

The invention also allows software developers to create applications with a wider range of controllable devices than was possible heretofore, for example, in a network-personalizing application as discussed in U.S. Ser. No. 09/160,490 filed Sep. 25,1998 for Adrian Turner et al., and U.S. Ser. No. 09/189,535 filed Nov. 10,1998 for Yevgeniy Eugene Shteyn for:,UPGRADING OF SYNERGETIC ASPECTS OF HOME NETWORKS, mentioned above. For personalizing services also see U.S. Ser. No. 09/283,545 filed Apr. 1, 1999 for Yevgeniy Eugene Shteyn for TIME- AND LOCATION-DRIVEN PERSONALIZED TV, incorporated herein by reference. This document relates to a server system and method that enable a subscriber to select a specific broadcast program for recording and a specific location and time frame for play-out of the recorded program.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

The invention enables home networks of different software architectures to be integrated with each other. References to software representations of devices and services on a first one of the networks are automatically created. The references are semantically sufficient to enable automatic creation of at least partly functionally equivalent software representations, for a second one of the networks so as to make the devices and services of the first network accessible from the second network.

Block Diagram Concepts

Figure 1:
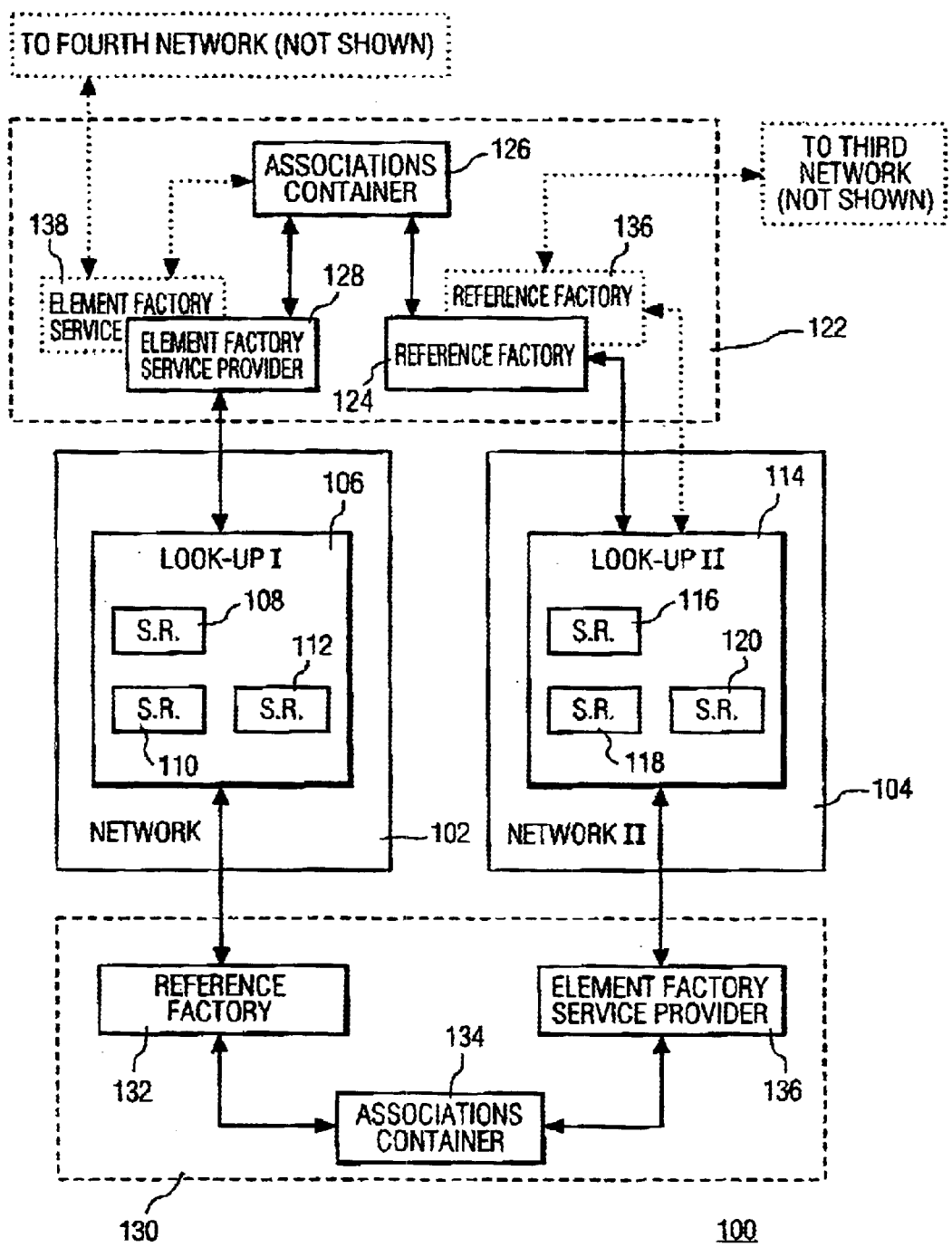
FIG. 1 is a block diagram of a system illustrating the invention.

FIG.1 is a block diagram of a system 100 to illustrate the invention. System 100 comprises first and second networks 102 and 104 that have different software architectures. For example, network 102 has a HAVi-based architecture and network 104 has a Home API-based architecture, or network 102 has a JINI-based architecture and network 104 has a HAVi architecture, etc.

First network 102 has a service 106 that enables querying software representations 108, 110, . . . , 112 of resources (devices and services) that have registered with network 102. The querying scans the attributes of representations 108–112. Service 106 enables registering, unregistering and querying of resources that can controlled and made to interact. Registering a resource requires a set of attributes and a reference for the representation. Unregistering requires providing the same reference and disabling access to the reference by software applications or other software objects. Querying involves providing a complete or partial set of attributes against which to match the registered entries. Similarly, network 104 has a service 114 that enables to discover and control resources that have their software representations 116, 118, 120 registered with it.

System 100 has means 122 that bridges networks 102 and 104 and serves to provide to network 102 control over one or more resources registered with network 104.

Means 122 comprises a software module (an object or an application) 124, called a Reference Factory. Reference Factory 124 is installed on network 104 and has access to any of software representations 116–120 through service 114. Reference Factory 124 is capable of querying the inventory of service 114 or of getting notified of a new software representation according to the methods of the software architecture of network 104. In this sense Factory 124 is specific to network 104. When Reference Factory 124 has found an object of interest, e.g., software representation 116, Factory 124 creates a reference or a set of references to representation 116.

Means 122 further has an Associations Container 126, a software representation for a repository for the references created by Factory 122 in order to make them available to all clients of network 104.

Means 122 also has a Software Element Factory 128 that is installed on network 102. Factory 128 chooses references from Container 126 and creates or retrieves pre-fabricated software representations based on the information contained in the references chosen and suitable for being installed on network 102, e.g., by registering or placing with service 106 according to the rules specified by the software architecture of network 102. Upon registering with service 106 the resources on network 104 become accessible and controllable from network 102.

Factory 124 is able to use the rules of the software architecture of network 104 in order to access service 114 and extract information to create the references. Factory 128 is able to use the rules of the software architecture of network 102 in order to access service 106 for registering newly created software representations based on the references in repository 126. Factory 126 and Factory 128 interface via repository 126. Repository 126 should therefore be capable of communicating the information content of the references created by Factory 124 to Factory 128. A possible mechanism to accomplish this is to have Factories 124 and 128 expose an interface to repository 126 based on the same language, e.g., XML. That is, the references supplied as output by Factory 124 are directly useable as input to Factory 128. Another mechanism is to have repository 126 be capable of translating or converting the information received from Factory 124 into suitably formatted output to Factory 128 using a conversion protocol. Within this context see, e.g., U.S. Ser. No. 09/165,682 (attorney docket PHA 23,484) referred to above, illustrating a generic kind of mapping protocol. Alternatively, specific conversion stages can be inserted between repository 126 on the one hand and networks 102 and 104 on the other hand.

Mutatis mutandis, a similar means 130 may be added that comprises a Reference Factory 132, a Container 134 and a Software Element Factory 136 to make the resources on network 102 controllable from network 104.

Multiple Reference Factories may be installed on network 104, for example a further Reference Factory 136 for providing specific reference information in order to enable a third network (not shown) of yet another software architecture to control one or more functionalities registered with network 104 similarly to the control from network 102. Each of these multiple Reference Factories can be responsible for certain types of references, e.g., another software environment (HAVi, JINI, Home native DCM for IAV etc.), or a class of resources (devices/services), e.g., data storage, home automation, A/V command set, etc.

Repository 126 may be accessible to a further Software Element Factory 138 for a fourth network, the further Factory being capable of directly or indirectly handling the references in repository 126.

Block Diagram Hardware Configuration HAVi-Home API

Figure 2:
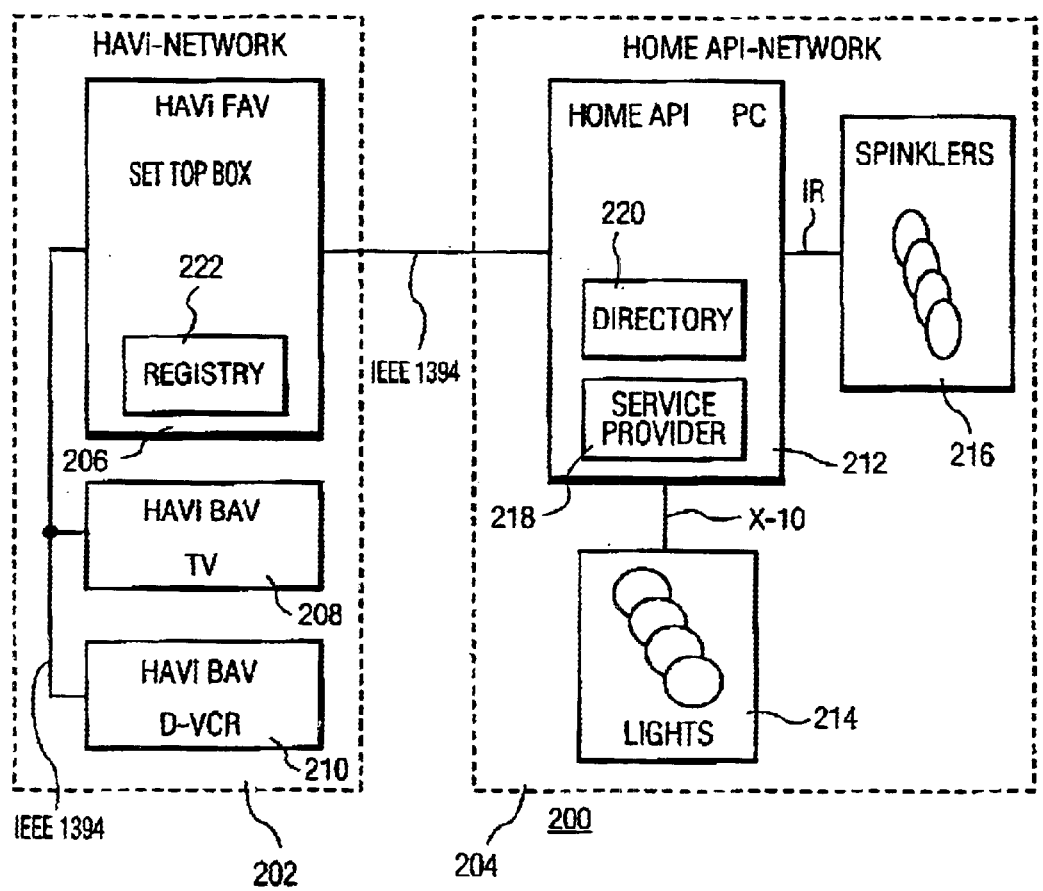
FIG. 2 is a block diagram of a HAVi/Home API hardware configuration.

FIG.2 illustrates the physical configuration of an integrated home network system 200 comprising a HAVi-based network 202 and a network 204 based on Home API.

Network 202 comprises a HAVi set top box 206 with FAV capabilities (see HAVi discussion above), a HAVi compliant TV 208 serving as a BAV (see HAVi discussion above) and a HAVi compliant D-VCR 210 also serving as a BAV. Devices 206, 208 and 210 are interconnected through a IEEE 1394 bus so as to enable set top box 206 to control TV 208 and D-VCR 210.

Network 204 comprises a PC 212 that is configured to control lights 214 via an X-10 connection, lawn sprinklers 216 via an IR connection, and other appliances (not shown) via associated connections.

Set top box 206 and PC 212 are interconnected through an IEEE 1394 bus. The IEEE 1394 connection enables PC 212 to access IEEE 1394 compliant devices. In order to take advantage of this capability, a Home API Service Provider 218 (see under ABackground Art≅ above or see the Home API spec.) for HAVI is installed on PC 204. HAVi-dedicated Service Provider 218 is capable of accessing a PC-based HAVi FAV-application or PC-based HAVi-IAV application environment. It may also implement or install an FAV or IAV environment itself, if none is available. Service Provider 218 then populates the Home API Directory 220 with COM objects representing HAVi devices, e.g., representing devices 206–210. This enables Home API applications on PC 212 to control HAVi devices 206–210.

However, this configuration does not allow HAVi-based applications on FAV 206 to access Home API software objects such as the ones for lights 214, lawn sprinklers 216 and for other devices registered with Directory 220. In order to achieve control from HAVi network 202, a set of HAVi-compliant Software Elements (e.g., DCM=s, FCM=s) needs to be installed in a HAVi Registry 222. The invention now proposes to introduce the concepts of the Reference Factory and Software Element Factory in order to enable this installation as discussed with reference to FIG. 1. This control capability allows the user, e.g., to turns on/off lights 214 via his/her HAVi set-top box 206, and to stop or reschedule sprinklers 216 to avoid noise while watching an interesting movie, etc.

Block Diagrams Creating Software Configuration HAVi-Home API

Figure 3:
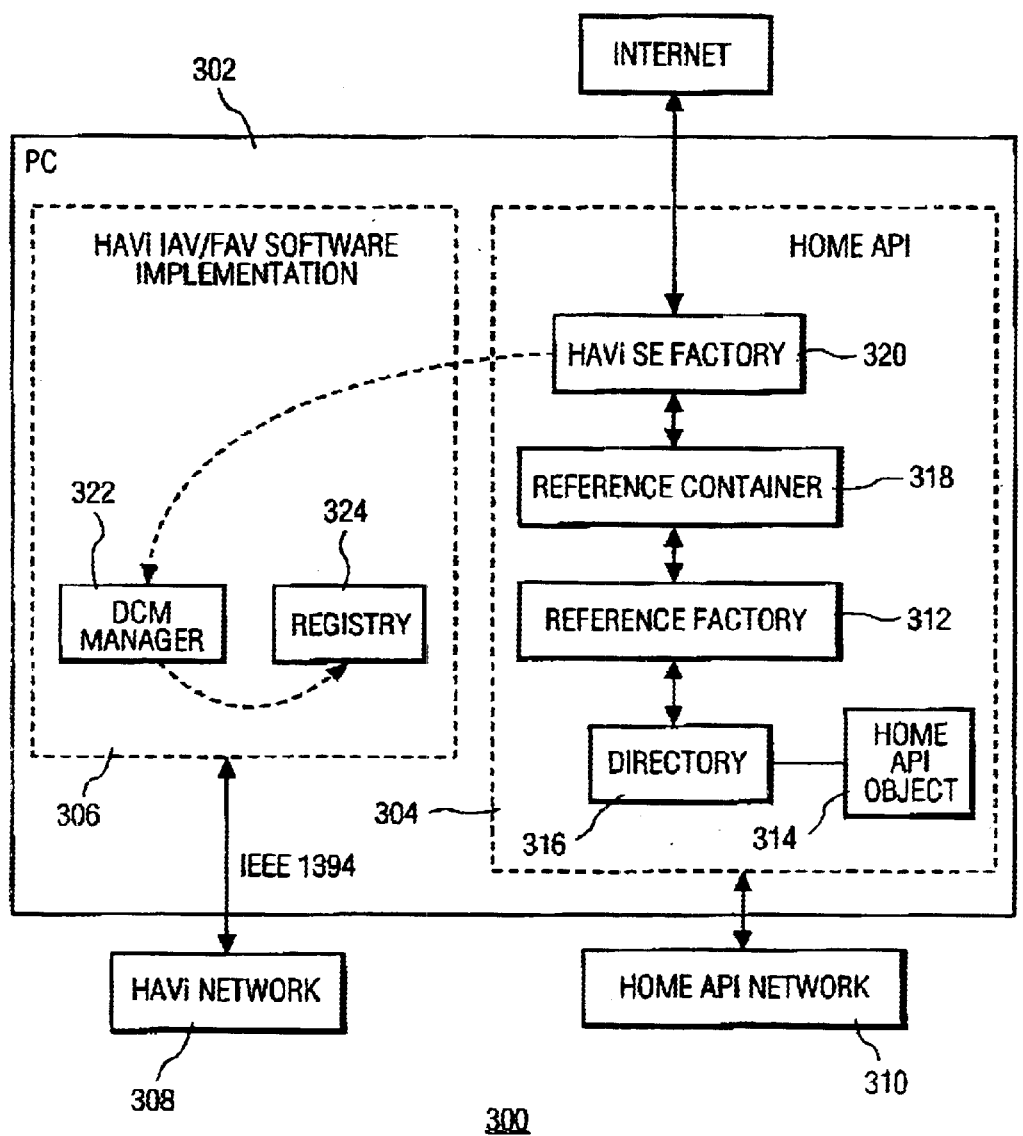
FIGS. 3 and 4 are block diagrams illustrating software configurations for a HAVi-Home API system.

FIG. 3 is a first block diagram illustrating asoftware configuration 300 of a HAVi-Home API bridge. Configuration 300 comprises a PC 302 with a Home API control environment 304, and a HAVi IAV/FAV software implementation 306. Configuration 300 also comprises HAVi network 308 and a Home API network 310. HAVi-dedicated software elements interacting with Home API environment 304 enable devices or services of network 310, which have registered with Home API environment 304 to be controlled from HAVi network 308.

As explained above, the invention provides a method to enable the bridging between different home networking environments, here HAVi network 308 and Home API network 310. To this end, Home API environment 304 comprises a software component 312, being an application or a software object and called a Reference Factory, which detects software representations of devices and services available in environment 304, e.g., an object 314. This detection can be done through enumeration and/or monitoring of Home API Directory 316 or accessing a Home API root or other container. Based on the capabilities of Reference Factory 312 and/or user-preferences, a reference or a set of references is created associated with the software representation of the device or service detected. Such reference comprises information about the software representation, e.g., object type, property descriptor, a class: id, an URL, an object unique identifier, an XML tag, DDI descriptor, etcΨ, necessary for the creation of an equivalent software representation of the same device or service but now for use within another network, here HAVi environment 304 and network 310. Factory 312 uses Home API notification mechanisms, such as event subscriptions or property routes, to detect software objects added to environment 304. When a software object is added to Home API environment 304, Reference Factory 312 is notified and, if necessary, reference(s) are created and placed into a Reference Container 318 associated with the object added.

In this example, Container 318 makes the references available to all Home API clients. For example, Reference Factory 312 accesses objects of interest, e.g., as specified by the user, through Home API Directory 316. For example, the user has specified that he/she is interested in objects ALight≅ 214. User preferences can be obtained by a configuration application/guide. The application or guide lists, for example, all available devices or types of devices available in a networking environment. It collects user input regarding which one(s) among them is to be accessible via another network. Reference Factory 312 identifies the software objects of interest in Directory 310 and creates a set of references for HAVi Software Elements, such as, but not limited to, ones that comprise DDI data, a Java DCM reference, or a Native (Binary) DCM. These references are placed in Reference Container 318 for ALights≅ 214. After Reference Factory 312 is installed it is subscribed, for example, through the Home API event mechanism, to the Home API root. The installer may subscribe Factory 312 to a specific container or part of Home API Directory 316, such as ALiving Room≅, in order to be able to control Living Room lights only. When a new light object is added to network 310, Factory 312 creates a new Reference, e.g., a DDI descriptor and an URL for a Java package representing the new light. Those references then are added to Container, 318 of the new light.

A HAVi Software Element Factory 320 is the software component responsible for accessing Home API objects of interest. In this example, it chooses appropriate references from Container 318 for the object ALights≅. Factory 320 creates HAVi Software Elements based on the references retrieved and using internal or external (e.g., the Internet) resources. See, e.g., the infrastructure as discussed in U.S. Ser. No. 09/160,490 (PHA 23,500) and U.S. Ser. No. 09/189, 535 (PHA 23,527) mentioned above. PC 302 has a DCM Manager 322 and a Registry 324 as parts of the HAVi IAV/FAV implementation on PC 302. Factory 320 interacts with HAVi DCM Manager 322 and HAVi Registry 324 according to HAVi architecture rules and/or Element Factory preferences. For example, Factory 320 creates DDI data in order to make the functionality of Home API object ALights≅ accessible via a display and HAVi applications hosted by HAVi network 308. Alternatively or subsidiarily, Factory 320 creates or retrieves from the Internet (via a URL) a Java DCM and registers it with Registry 324 so as to enable HAVi applications or other DCMs to interact with the software representation of ALights≅ 214.

As to the installation of Reference Factory 302, this can be enabled by, e.g., a device manufacturer during device installation on the network. For example: Philips lights can be packaged with PC software comprising Reference Factory software object 302 to enable HAVi access. The installation can be taken care of by a Service Provider, by the user his/herself or by a third party as part of a PC software functionality upgrade.

As to installation of Software Element Factory 320, this may be installed by a HAVi Service Provider or by a third party, the user him/herself or a Service Provider to upgrade an existing Element Factory.

Figure 4:
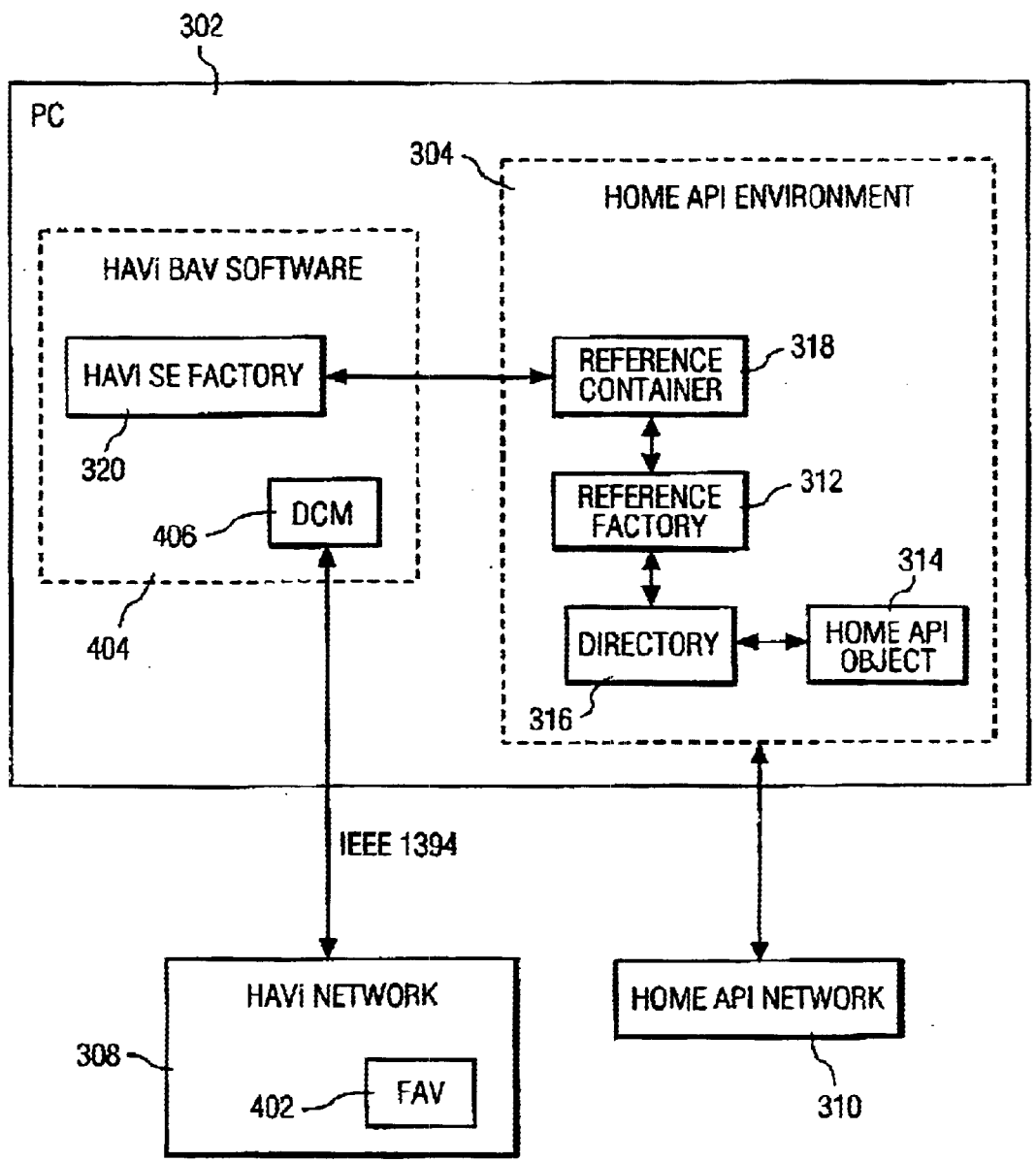

FIG. 4 is a second block diagram illustrating a software configuration 400 of a HAVi-Home API bridge. Configuration 400 comprises a PC 302 with a Home API control environment 304 and Home API network 310. Configuration 400 also comprises HAVi network 308 including a HAVi FAV 402. Now, PC 302 has a software module 404 for representing Home API control environment 304 on HAVi network 308. Module 404 is a HAVi BAV that comprises Software Element Factory 320, interacting with other BAV software components in order to represent Home API object 314 as a DCM 406 (or an FCM) on HAVi network 308. DCM manager(s) (not shown) on HAVi FAV or IAV devices interact with BAV software 404 in order to make Home API object 314 available on network 308 through DCM 406.

Also see U.S. Ser. No. 09/146,020 now U.S. Pat. No. 6,199,136, listed above for this configuration.

Within the context of installing Software Elements, reference is made to U.S. Ser. No. 09/160,490 filed Sep. 25, 1998 for Adrian Turner et al., for CUSTOMIZED UPGRADING OF INTERNET-ENABLED DEVICES BASED ON USER-PROFILE, mentioned above, and to U.S. Ser. No. 09/189,535 filed Nov. 10,1998 for Yevgeniy Eugene Shteyn for UPGRADING OF SYNERGETIC ASPECTS OF HOME NETWORKS, mentioned above.

As another example, a HAVi-UPnP bridge is built by exposing HAVi software elements to the UPnP network and vice versa. XML is the basis for the representation of devices in UPnP. In order to participate in a UPnP network HAVi software elements need to have an XML representation associated with them. Such a representation can be created "on the fly", i.e., each time per connection/enumeration request, or, preferably, once and placed in the Registry as an attribute of the Software Element or a separate Software Element associated with the first one by a unique Software Element ID. If a direct translation to XML of a specific HAVi software element is functionality not possible (e.g., a software element is represented by a third-party Java object, etc . . . ), a generic XML representation can be created. The Software Element (DCM, FCM) manufacturer may provide a preferred XML representation of the component, if participation in the UpnP network is intended. Similarly, the HAVi DDI interface can be translated into XML, based on the published DDI user interface elements (see, e.g., section 4 of the HAVi specification for further details). The Java reflection mechanism can be used to query interfaces of a particular Java object and an equivalent XML model can be created if the interface is found to be known.

I claim:

1. A method of enabling a first home network of a first software architecture to interact with a second home network of a second software architecture that is different from the first software architecture, the method comprising:

detecting a first software representation of a device or of a service that is registered in the first network, the first software representation being comprised of a device or service-specific API that enables software applications within the first network to control interaction with a first respective set of one or more functionalities of the device or service in accordance with the first software architecture;

in response to detection of the first software representation, forming a reference of the first software representation, the reference comprising information defining the functionalities performed by the device or service that are relevant to the second network;

creating an at least partly functionally equivalent second software representation based on the created reference, the second software representation being comprised of a device or service-specific API for controlling interaction with a second respective set of one or more functionalities of the device or service in accordance with the second software architecture; and registering the second software representation such that software applications within the second network are enabled to interact with the device or service in accordance with the second software architecture using the second software representation.

2. The method of claim 1, wherein:
one of the first and second networks is based on a HAVi architecture; and
the other of the first and second networks is based on a Home API architecture.

3. The method of claim 1, wherein:
one of the first and second networks is based on a Home API architecture; and
the other of the first and second networks is based on a JINI architecture.

4. The method of claim 1, wherein:
one of the first and second networks is based on a Home API architecture; and
the other of the first and second networks is based on a UPnP architecture.

5. The method of claim 1, wherein:
one of the first and second networks is based on a JINI architecture; and
the other of the first and second networks is based on a HAVi architecture.

6. The method of claim 1, wherein:
one of the first and second networks is based on a JINI architecture; and
the other of the first and second networks is based on a UPnP architecture.

7. The method of claim 1, wherein:
one of the first and second networks is based on a UPnP architecture; and
the other network is based on a HAVi architecture.

8. The method of claim 1, wherein:
the first network has an inventory of devices and/or services registered with the first network;
the step of detecting comprises querying the inventory;
the step of forming comprises extracting information about the first software representation relevant to the second network; and
the step of creating comprises providing a second software representation based on the information extracted.

9. The method of claim 1, wherein the first software representation comprises a first software object and the second software representation comprises a second software object.

10. An information processing system comprising:
a first home network of a first software architecture; and
a second home network of a second software architecture that is different from the first software architecture; wherein:
the first network has a look-up service for detecting a first software representation of a first device or of a first service that is registered in the first network, the first software representation being comprised of a device or service-specific API that enables software applications within the first network to control interaction with a first respective set of one or more functionalities of the first device or first service in accordance with the first software architecture;
the system has a reference generator for creating a reference of the first software representation through interaction with the look-up service, the reference comprising information defining the functionalities performed by the device or service that are relevant to the second network;

the system has a software element generator for creating an at least partly functionally equivalent second software representation based on the reference, the second software representation being comprised of a device or service-specific API for controlling interaction with a second respective set of one or more functionalities of the first device or first service in accordance with the second software architecture; and a second look-up service associated with the second network and configured to register the second software representation such that software applications within the second network are enabled to interact with the device or service in accordance with the second software architecture using the second software representation.

11. A software component for use on a home environment system, comprising:

a first network of a first software architecture, and a second home network of a second software architecture different from the first software architecture;

the first network has a look-up service for detecting a first software representation of a first device or of a first service that is registered in the first network, the first software representation being comprised of a device or service-specific API that enables software applications within the first network to control interaction with a first respective set of one or more functionalities of the first device or first service in accordance with the first software architecture;

a reference generator for creating a reference to the first software representation through interaction with the look-up service, the reference comprising information defining the functionalities performed by the device or service that are relevant to the second network;

a container for storing the reference;

a software element generator configured to retrieve the reference from the container and create an at least partly functionally equivalent second software representation based on the reference, the second software representation being comprised of a device or service-specific API for controlling interaction with a second respective set of one or more functionalities of the first device or first service in accordance with the second software architecture; and a second look-up service associated with the second network and configured to register the second software representation such that software applications within the second network are enabled to interact with the device or service in accordance with the second software architecture using the second software representation.

12. A software component for use on a home environment system, comprising:

a first network of a first software architecture, and a second network of a second software architecture different from the first software architecture;

the first network has a look-up service for detecting a first software representation of a first device or of a first service that is registered in the first network, the first software representation being comprised of a device or service-specific API that enables software applications within the first network to control interaction with a first respective set of one or more functionalities of the first device or first service;

the first network has a reference to the first software representation, the reference comprising information defining the functionalities performed by the device or service that are relevant to the second network;

the component has a software element generator for creating an at least partly functionally equivalent second software representation based on the reference, the second software representation being comprised of a device or service-specific API for controlling interaction with a second respective set of one or more functionalities of the first device or first service in accordance with the second software architecture; and a second look-up service associated with the second network and configured to register the second software representation such that software applications within the second network are enabled to interact with the device or service in accordance with the second software architecture using the second software representation.

* * * * *